(12) United States Patent
Allemand et al.

(10) Patent No.: US 6,514,310 B2
(45) Date of Patent: Feb. 4, 2003

(54) PROCESS FOR INJECTION OF A GAS WITH THE AID OF A NOZZLE

(75) Inventors: Bruno Allemand, Paris cedex (FR); Christel Champinot, Paris cedex (FR); Stéphane Melen, Paris cedex (FR); Jean-Claude Vuillermoz, Paris cedex (FR); Sabastien Flichy, Paris cedex (FR); Jacky Laurent, Paris cedex (FR)

(73) Assignee: L'Air Liquide Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/912,533

(22) Filed: Jul. 26, 2001

(65) Prior Publication Data
US 2002/0035892 A1 Mar. 28, 2002

(30) Foreign Application Priority Data

Aug. 7, 2000 (FR) .......................................... 00 10393
Nov. 9, 2000 (FR) .......................................... 00 14405

(51) Int. Cl.$^7$ ............................................. C21C 7/072
(52) U.S. Cl. ............................. 75/414; 75/530; 75/553
(58) Field of Search ......................... 75/414, 553, 530

(56) References Cited

U.S. PATENT DOCUMENTS 6,322,610 B1 * 11/2001 Pavlicevic et al. ............ 75/414

FOREIGN PATENT DOCUMENTS

| JP | 8-3618 | 6/1994 |
| JP | 11-158529 | 6/1999 |

OTHER PUBLICATIONS

Koria, "Principles and applications of gas injection in steel-making practice;" *Scand. J. Metallurgy*; Oct. 1993, vol. 22, No. 5, pp. 271–279.

Kazuyasu et al, "Investigation of Supersonic Air Ejectros—2—Effects of Throat–Area–Ratio on Ejector Performance;" *Bull JSME*, Dec. 1982, vol. 25, No. 210.

* cited by examiner

*Primary Examiner*—Melvyn Andrews
(74) *Attorney, Agent, or Firm*—Burns, Doane, Swecker & Mathis, L.L.P.

(57) ABSTRACT

The electric arc furnace is equipped with a supersonic injector comprising a so-called Laval nozzle arranged at a certain distance above the bath. The dimensions of the nozzle are calculated as a function of the desired flow rate of oxygen and the desired velocity of the jet, and the pressure of the oxygen at the intake of the nozzle is such that the static pressure of the jet at the exit of the injector is substantially equal to the pressure of the surrounding atmosphere. Preferably, the injector comprises an annular channel for injection of natural gas, and can be used in burner mode at the start of the melting of scrap iron. The velocity of the oxygen is then subsonic.

62 Claims, 7 Drawing Sheets

PROCESS FOR INJECTION OF A GAS WITH THE AID OF A NOZZLE

PROCESS FOR INJECTION OF A GAS WITH THE AID OF A NOZZLE

1. Field of the Invention

Figure 1:
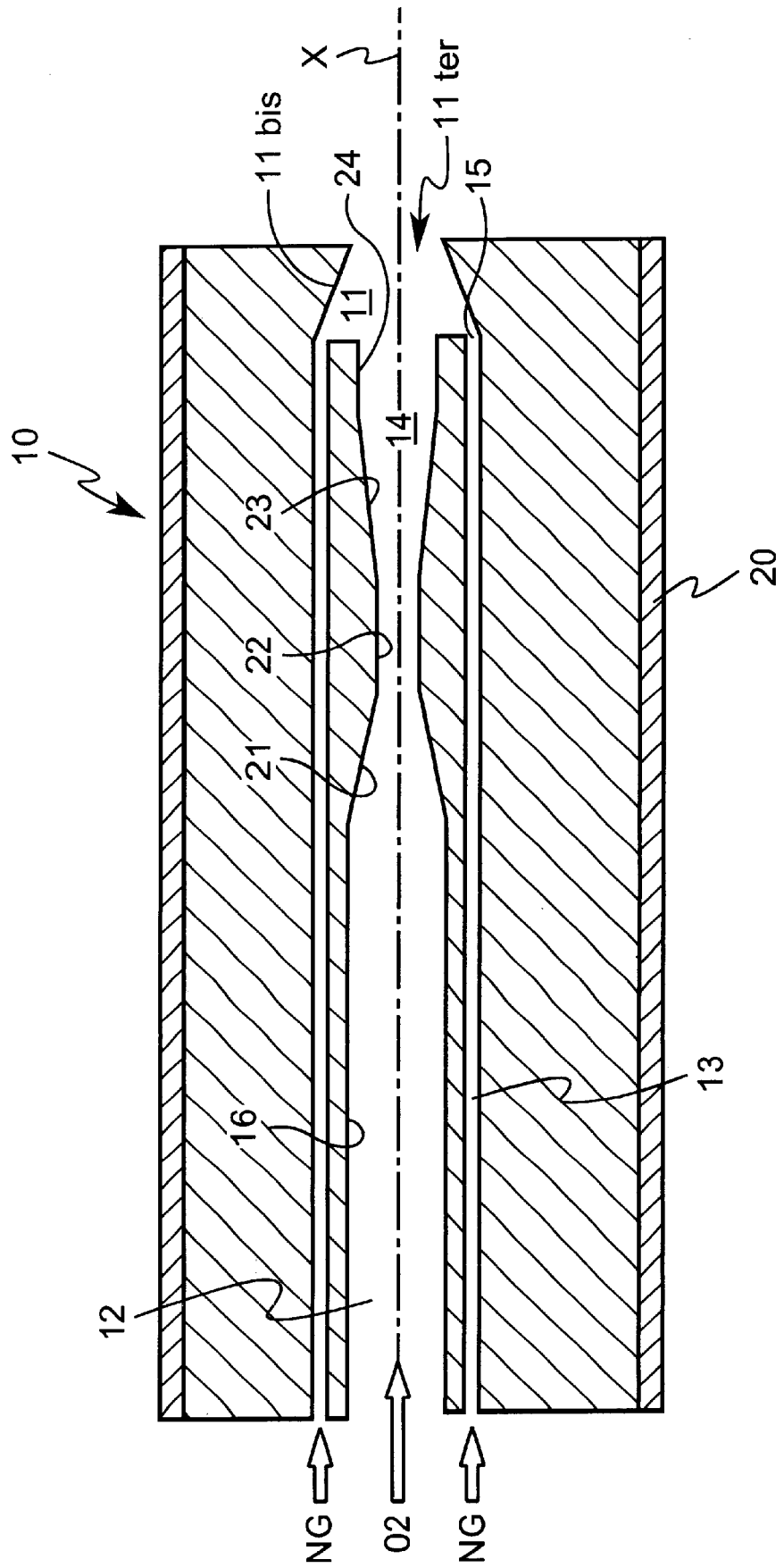

The present invention relates to the injection of a gas into a liquid, and in particular a liquid metal. More particularly, it relates to the field of metallurgical reactors, such as melting furnaces, converters of pig iron, of alloyed or non-alloyed steels or of non-ferrous materials, as well as the electric arc furnaces used in particular for the production of steel from scrap iron or scrap iron substitutes, and generally to any injection of a gas into a liquid.

2. Description of the Related Art

In the technology of production of steel in an electric arc furnace, scrap iron or its substitutes are melted by establishing an electric arc between the electrodes of the furnace and the metal such as to supply the energy to melt the metal during the melting phase and to keep it in the molten state during the phase of refining the said metal.

During this refining phase, oxygen is used to decarburize the metal and to form a so-called foaming slag by reaction of the oxygen with the carbon produced from the metal or injected at the surface of the metal bath specifically for this purpose.

This injection of oxygen can be carried out with the aid of door lances which are expendable or cooled with water. In this case, the lance is mounted on a mobile component, which involves an employee assigned to its use, and high maintenance. Furthermore, the oxygen is not injected uniformly into the bath, which adversely affects the high performance of the furnace, the metal bath being homogeneous neither in temperature nor in chemical composition.

This injection can also be carried out with the aid of injectors arranged in the wall of the furnace. This arrangement allows the oxygen to be distributed more uniformly in the metal bath and the slag and the thermal yield of the furnace to be increased, which enables the steel production time to be reduced and the air intakes to be reduced due to a better tightness of the furnace (the door of the furnace can be closed due to the omission of the door lance). However, such an injector must be capable of withstanding the high thermal loads without being destroyed prematurely, and capable of injecting the oxygen under conditions such as may be reached in the bath of liquid metal and of penetrating into this. The obvious solution to the person skilled in the art comprises placing the injector of oxygen close to the metal bath to ensure that the oxygen reaches the said bath. However, the closeness of the metal bath causes premature wear of the injector.

To reduce the wear, the person skilled in the art tends to move the end of the lance away from the surface, to the detriment of the penetration of the jet into the liquid metal.

It is known from GB-A 623 881 to use a supersonic injection lance to inject the oxygen at supersonic velocity for the decarburization of steel in a liquid bath. The problem which results from this type of installation is that the jet of oxygen opens out at the exit of the injector nozzle, which reduces the force of penetration of the jet into the bath and increases the risks of splashes.

In order to improve the force of penetration of the jet of oxygen into the metal bath, it is known from Re 33 464, in particular col. 7, lines 32 to 41, to use a supersonic jet of oxygen and to surround this jet with a flame, the envelope of this flame extending substantially up to the surface of the molten metal. Due to the flame surrounding this jet (and its high temperature), such systems are said to be capable of preserving all the coherence of this jet, avoiding disintegration thereof. Such systems are thus said to improve the penetration of the oxygen into the bath.

While in theory it appears obvious to the person skilled in the art that the increase in the temperature around the jet will cause a reduction in the density of the ambient medium and therefore cause an effect of lower resistance of this medium with respect to a cooler medium, which in theory enables the supersonic jet to remain more "coherent", it has been found, however, that in practice the interactions between the flame and the jet, such as, for example, buoyancy effects, in fact have adverse effects on the jet and reduce the force of penetration. These buoyancy effects are caused by the hot current of a flame in a medium which is colder than this flame. The flame which surrounds the supersonic jet and which passes through a medium at a temperature of about 1500° C., while the temperature of the flame is close to 2300° C. or higher, thus bends upwards, and interacts with the jet during this ascent, in particular in the vicinity of the bath, precisely where it could have been hoped to preserve the "coherence" of the supersonic jet. This coherence is now in fact destroyed.

It is furthermore known that the use of a flame created by a burner in an electrical metallurgy furnace is an effective complement for supplying energy to the charge, and thus increases the rate of melting. The exchange of energy between the flame and the charge is effective as long as the exchange surface is significant, that is to say as long as the scrap iron has not melted, and the temperature difference between the flame and the charge is high.

The process according to the invention enables these disadvantages to be avoided.

SUMMARY OF THE INVENTION

According to the invention, a process is provided for injection of a gas, such as oxygen, with the aid of a nozzle into a liquid metal bath contained in a metallurgical vessel, the said nozzle being installed in the side wall of the said vessel above the metal bath and orientated at an angle $\alpha$ with respect to the perpendicular, the downstream end of the nozzle through which the gas escapes in the direction of the liquid metal bath being situated at a distance L from the surface of the liquid metal, the said nozzle being fed by the gas which penetrates into the nozzle through its upstream end at a pressure $P_1$, and being ejected from the nozzle through its downstream end at a pressure $P_2$, which process is characterized in that the downstream pressure $P_2$ of ejection of the gas into the metallurgical vessel and the pressure $P_3$ in the metallurgical vessel are connected to one another by the relationship:

$$0.9 P_3 \leq P_2 \leq 1.1 P_3$$

in that the distance L between the downstream end of the nozzle and the surface of the liquid metal is equal to:

$$L(\text{meters}) = C * \sqrt{q_e} \pm 0.15 m$$

Where $$C = \sqrt{\frac{4}{\pi * P_2 * M}} \left[\frac{\gamma}{RTo}\left(1 + \frac{\gamma-1}{2}M^2\right)\right]^{-1/4} *$$

$$\left[4.2 + 1.1 * \left(M^2 + 1 - \frac{T_j}{T_a}\right)\right]\sqrt{\frac{\rho_j}{\rho_a}}$$

Notation:
$P_2$: pressure of the jet at the exit (Pa), which must be equal to the pressure in the metallurgical vessel. In the case of an arc furnace, $P_2 = 10^5$ Pa.
M: Mach number calculated according to the following formula:

$$M^2 = \frac{2}{(\gamma-1)} * \left[\left(\frac{P_1}{P_2}\right)^{\left(\frac{\gamma-1}{\gamma}\right)} - 1\right]$$

(this can be taken between 1.5, corresponding to an upstream pressure P1 of $3.7 \times 10^5$ Pa, and 3.15 for a pressure P1 of $45 \times 10^5$ Pa).
$T_o$: temperature of the gas (K) (in general 294K)
R: ideal gas constant (8.314/molar mass of the gas),
qe: mass flow rate (kg/s)=volume flow rate ($Sm^3/h$)*molar mass of the gas/3600/0.0224 (1/mol)
$T_j$: temperature at the exit of the nozzle (K)
$\rho_j$: density of the jet at the exit of the nozzle (kg/m$^3$), calculated from:

$$\frac{P_2}{R * T_j}$$

$T_a$: temperature of the ambient medium (K)
$\rho_a$: density of the ambient medium (kg/m$^3$), calculated from:

$$\frac{P_3}{R * T_a}$$

and in that the injection of gas is carried out when the temperature of the gases in the metallurgical vessel is greater than 800° C., preferably 1000° C.

The gas injected will preferably be chosen from oxygen, nitrogen, argon, hydrogen, carbon monoxide, carbon dioxide, hydrocarbons and, in particular, alkanes, alkenes and alkynes, natural gas and sulphur hexafluoride, these gases being injected by themselves or as mixtures.

According to a preferred embodiment, the velocity of the gas during its ejection by the nozzle will be supersonic. Preferably also, the nozzle for injection of the gas is a nozzle comprising, from upstream to downstream, according to the direction of entrainment of the gas, a convergent truncated upstream part, followed by a cylindrical central part, followed by a divergent truncated downstream part, followed by a cylindrical part which emerges over the atmosphere of the metallurgical vessel, and the angle α will preferably be between 30°≦α≦60°, and more preferably α=45°±5°.

According to one embodiment of the invention, the process is regarded in that the nozzle for injection of the gas is a nozzle comprising, from upstream to downstream, according to the direction of entrainment of the gas, a convergent truncated upstream part, followed by a cylindrical central part, followed by a divergent truncated downstream part which emerges over the atmosphere of the metallurgical vessel, the ratio of the vertex angles of the convergent and divergent cones respectively being between about 1.5 and 2.5.

According to another embodiment, the convergent cone (21) half-angle is between 2 and 12° and the divergent cone (23) half-angle is between 15° and 35°.

According to another embodiment, the process according to the invention is characterized in that the flow rate of gas is between 50 and 5000 Sm$^3$/h, and preferably between 1000 and 3500 Sm$^3$/h.

According to another variant, the process according to the invention is characterized in that the velocity of the flame is between 150 m/s and 300 m/s.

According to one embodiment of the invention, the gas injected into the metal will be a hydrocarbon or a mixture of gaseous hydrocarbons, preferably natural gas.

The injection of gas, preferably supersonic, will be carried out, for example, in alternation with the injection of a flame into the metallurgical vessel from a wall of the vessel in the direction of the solid and/or liquid metal present in the vessel.

According to another variant, the injection of gas will be carried out simultaneously with that of a flame into the metallurgical vessel from a wall of the vessel in the direction of the solid and/or liquid metal present in the vessel, where it will be desirable to obtain simultaneously energy for heating the metal and to carry out an injection of gas into the metal (such as, for example, oxygen for decarburization)

The jet of gas at the exit of the nozzle will be an adjusted jet, that is to say a jet of which the static pressure at the exit of the injector is equal to the pressure prevailing in the atmosphere passed through by this jet, to about + or –10% of this pressure. It has been found that an adjusted jet allowed, for example, a supersonic velocity of the gas to be maintained over the longest distance possible for a given available gas pressure, since the creation of shock waves, which would reduce the kinetic energy of the jet, was avoided in this way. Such an adapted jet can be delivered by an injector comprising a so-called Laval nozzle which has, from upstream to downstream, a converging part, a throat where the velocity of the oxygen becomes sonic, a diverging part where the velocity of the oxygen becomes supersonic and a straight (cylindrical) part for stabilizing the jet of oxygen, that is to say channelling the jet and reducing any turbulence. The said nozzle has dimensions which are a function of the desired flow rate and exit velocity of the jet of oxygen, and the pressure of the oxygen at the intake of the nozzle is regulated such that the exit pressure of the jet is substantially equal to the pressure of the surrounding atmosphere (in the metallurgical vessel, for example). The substantial equality (preferably a difference of less than about 10%) between these two pressures allows the compression-expansion effects, which result in the supersonic jet with all the more intensity the greater the pressure difference, to be limited. These compression-expansion effects here considerably reduce the kinetic energy of the jet, and therefore the isovelocity length (length over which the jet maintains its initial velocity). Thus, for example, if the nominal intake (upstream) pressure of the gas in the nozzle is reduced by $3 \times 10^5$ P, this results in a reduction in the isovelocity length of about 35%.

The use of the injector in supersonic mode is necessary during the periods of the refining of the charge of molten metal, in particular in the electric arc furnace. However, it can start during the period of melting of the charge. On furnaces using charges based on AIS ("Alternative Iron Sources"), the supersonic mode can be used during the entire melting and refining.

The ratio of the flow rates of oxygen delivered by the injector in supersonic mode and in burner mode is advantageously substantially equal to 5.

Furthermore, according to the prior art as described in GB-A-623 881, the arrangement of such a nozzle, in particular a supersonic nozzle, on the walls of the furnace was based on empirical rules leading to a very uncertain effectiveness of this device.

An other object of the present invention is to be able to determine, as a function of specific parameters of the furnace, and in particular the flow rate of the gases, the operating conditions of the furnace (temperature and pressure), the available pressure of the gas injected into the nozzle, the maximum isovelocity length of the jet (that is to say the maximum length where the velocity of the gas injected, such as oxygen, remains substantially constant to ±10%), and thus to be able to determine the best arrangement of the injector on the walls of the furnace.

According to the invention, this distance L between the nozzle of the injector and the surface of the metal bath would be equal to:

$$L_m = C * \sqrt{qe} \pm 0.15 m$$

where $$C = \sqrt{\frac{4}{\pi * P_2 * M}} \left[ \frac{\gamma}{RTo} \left( 1 + \frac{\gamma-1}{2} M^2 \right) \right]^{-1/4} *$$

$$\left[ 4.2 + 1.1 * \left( M^2 + 1 - \frac{T_j}{T_a} \right) \right] \sqrt{\frac{\rho_j}{\rho_a}}$$

$P_2$: pressure of the jet at the exit (Pa), which must be equal to the pressure in the metallurgical vessel. In the case of an arc furnace, $P_2 = 10^5$ Pa.

M: Mach number calculated according to the following formula:

$$M^2 = \frac{2}{(\gamma-1)} * \left[ \left( \frac{P_1}{P_2} \right)^{\left( \frac{\gamma-1}{\gamma} \right)} - 1 \right]$$

(this can be taken between 1.5, corresponding to an upstream pressure P1 of 3.7×10⁵ Pa, and 3.15 for a pressure P1 of 45×10⁵ Pa).

$T_o$: temperature of the oxygen (K) (in general 294 K)

γ: ratio of $C_p/C_v$, $C_p$ and $C_v$ being, respectively, the molar thermal capacities at constant pressure or volume. For oxygen at To, of the order of 1.4.

R: ideal gas constant (8.314/molar mass of O2)

qe: mass flow rate (kg/s)=volume flow rate (Sm³/h)*molar mass of oxygen/3600/0.0224 (l/mol)

$T_j$: temperature at the exit of the nozzle (K)

$\rho_j$: density of the jet at the exit of the nozzle (kg/m³), calculated from:

$$\frac{P_2}{R * T_j}$$

$T_a$: temperature of the ambient medium (K)

$\rho_a$: density of the ambient medium (kg/m³), calculated from:

$$\frac{P_3}{R * T_a}$$

In the case of electric arc furnaces:

1.1<M<3.5

1000 Sm³/h<volume flow rate<20 000 Sm³/h

1400° C.≦ambient T (T° inside the electric furnace during refining)<2500° C.

According to another variant of the invention, an injector comprises a nozzle which has, from upstream to downstream, a converging part, a throat where the velocity of the oxygen becomes sonic, a diverging part where the velocity of the oxygen becomes supersonic and a straight (cylindrical) part for stabilizing the jet of oxygen. The said nozzle has dimensions which are a function of the desired flow rate and exit velocity of the jet of gas, the pressure of the gas at the intake of the nozzle being such that the exit pressure of the jet is substantially equal to the pressure of the surrounding atmosphere. The substantial equalness (difference of less than 10⁵ pascals) between these two pressures enables the compression-expansion effects, which result in the generally supersonic jet delivered by this nozzle, to be limited. These compression-expansion effects here reduce the kinetic energy of the jet. It is therefore necessary to limit these effects, resulting in the need for an adjusted jet (that is to say of which the static exit pressure is substantially equal to the pressure of the surrounding atmosphere to plus or minus 10⁵ Pascal).

In order to avoid the creation of shock waves inside the nozzle, the latter preferably has rounded joining surfaces, according to well-defined specifications described below, between, respectively, the converging part and the throat, the throat and the diverging part, and the diverging part and the straight part.

According to another characteristic of the invention, the start of the melting of the metal is accelerated by burning a fuel, such as, for example, a natural gas, during the period of melting of the scrap iron, this natural gas being introduced, for example, through an annular channel surrounding the nozzle, the oxygen necessary for the combustion of the natural gas being injected through the nozzle. During this phase, the oxygen is injected at a much lower pressure at the intake thereof, such that it is ejected by the nozzle at a subsonic velocity. In order to create a stable flame between the oxygen, injected at a velocity of between 100 m/s and about 300 m/s, on the one hand and the fuel, such as the natural gas, injected at a generally much lower velocity, for example between about 30 m/s and 150 m/s, the fuel and the carburizing agent are mixed in a combustion chamber.

This arrangement has, in particular, the advantage over devices and processes in which a flame surrounds the supersonic jet of causing the injector to function in a lance mode (a single fluid injected) or burner mode (two fluids injected) with solely two gas feeds (one for the oxygen, the other for the natural gas) instead of three gas feeds necessary in the known devices and processes.

The processes and apparatuses according to the invention of course have, in addition to the advantages mentioned above, that is to say a supersonic injection, when this is necessary, without a shock wave, thus having a better penetration into the metal jet, the following advantages: for an even penetration into the molten metal, it is possible to locate the end of the lance much further from the surface of the metal bath than a normal lance (without a flame). For an even penetration into the molten metal, it is possible to locate this lance according to the invention at a distance similar to the distance at which a lance surrounded by a flame (such as described in Re 33 464) is placed, without having the need for this flame in order to achieve it, which allows actual savings in gas consumption for the client, for the same outputs.

BRIEF DESCRIPTION OF THE FIGURE OF THE DRAWING

Figure 2:
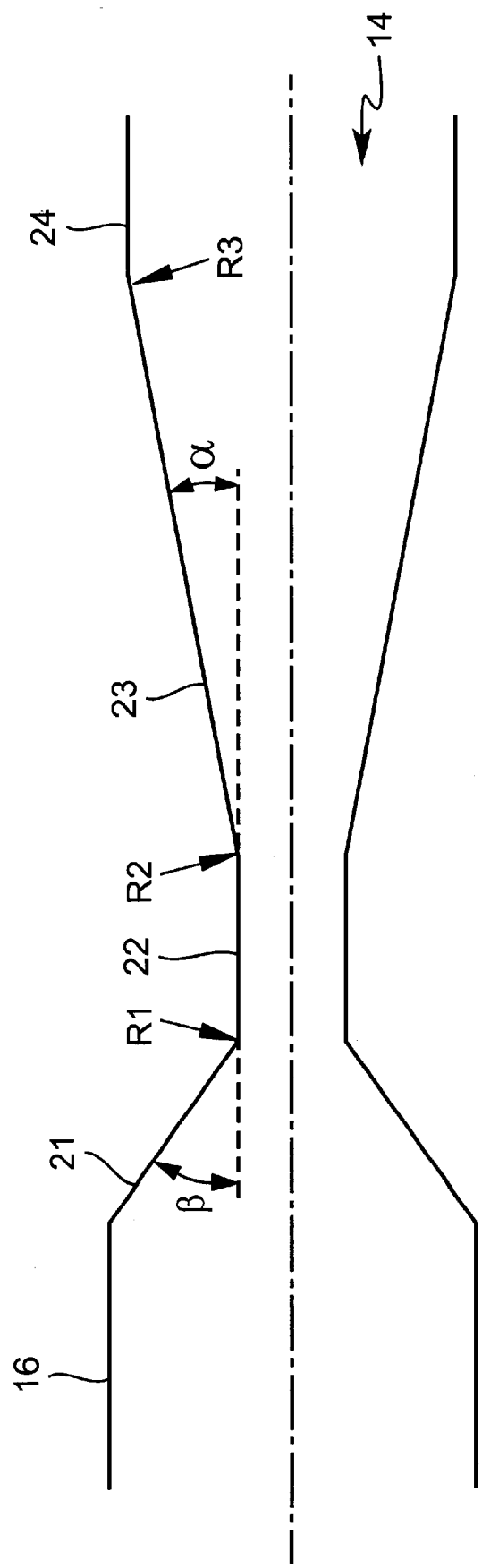
Figure 3:
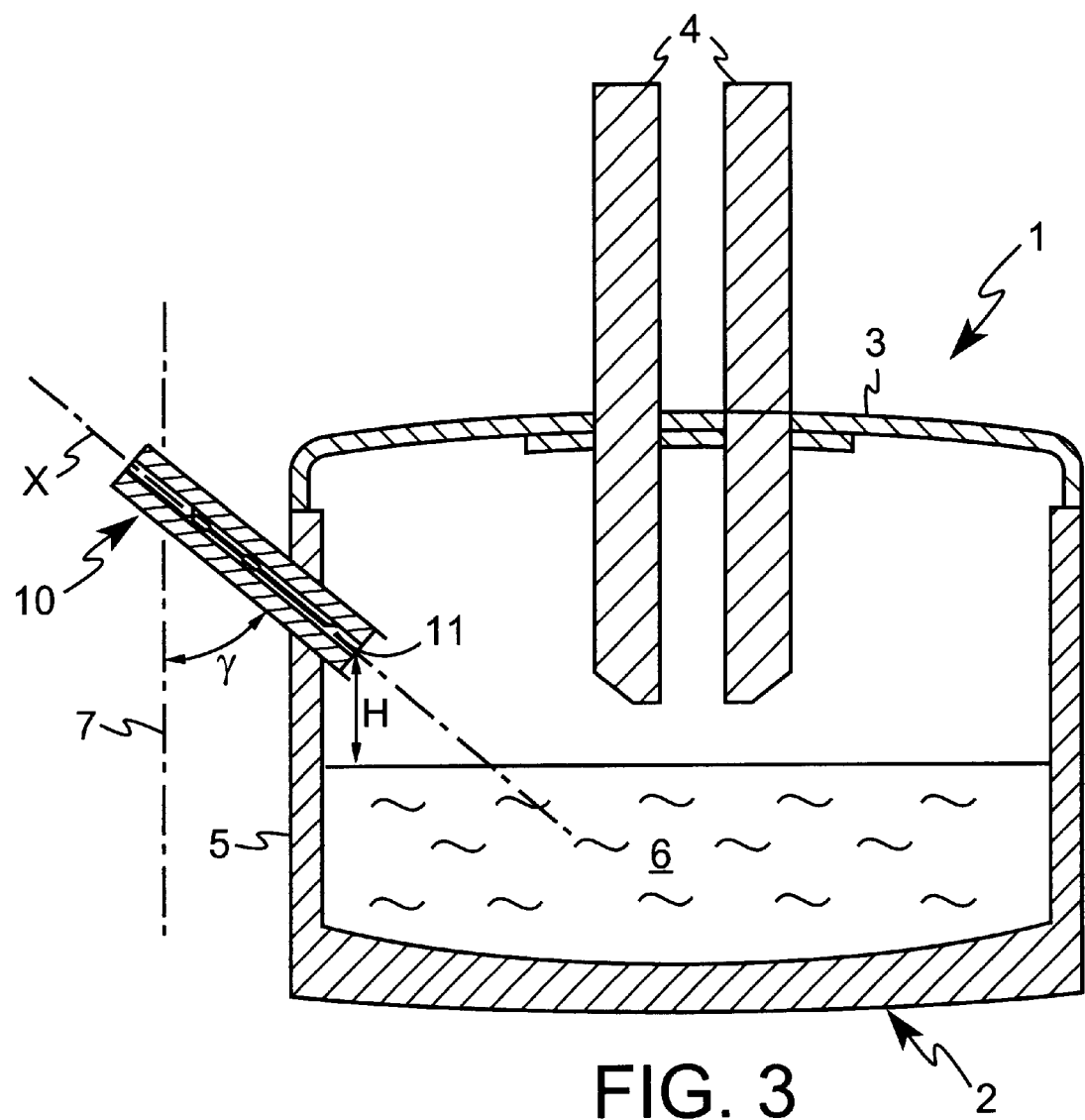
Figure 4:
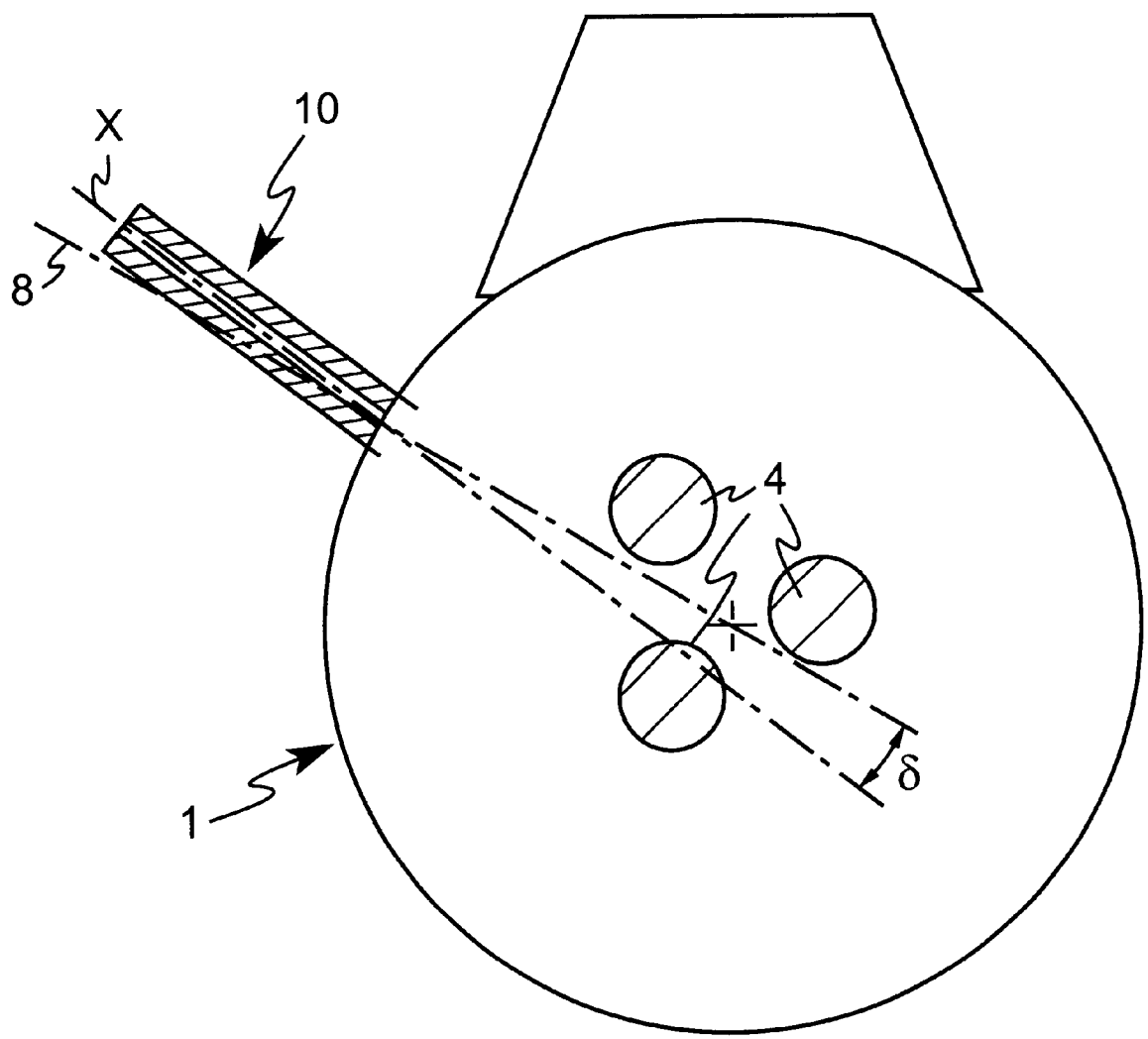
Figure 5:
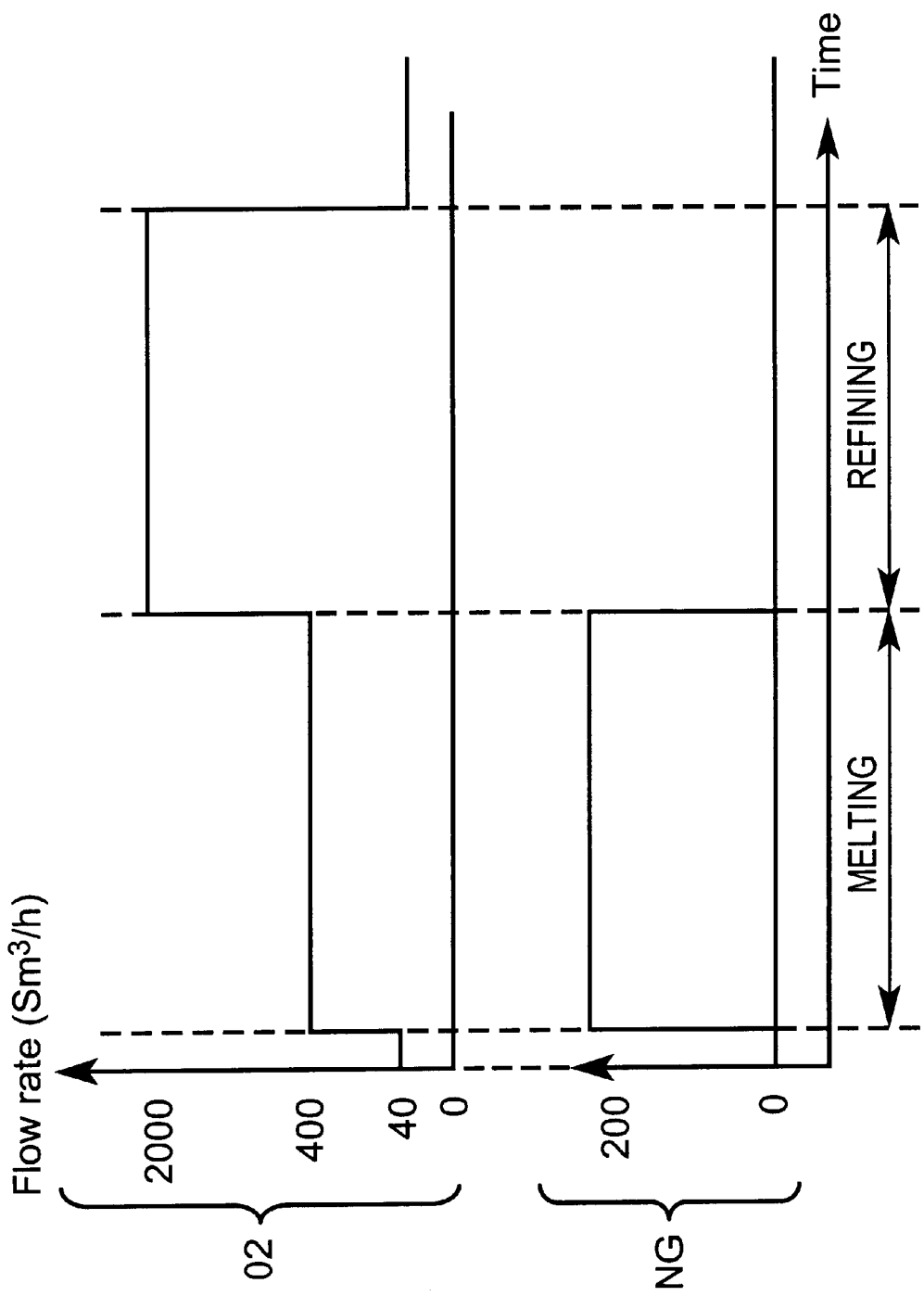
Figure 6:
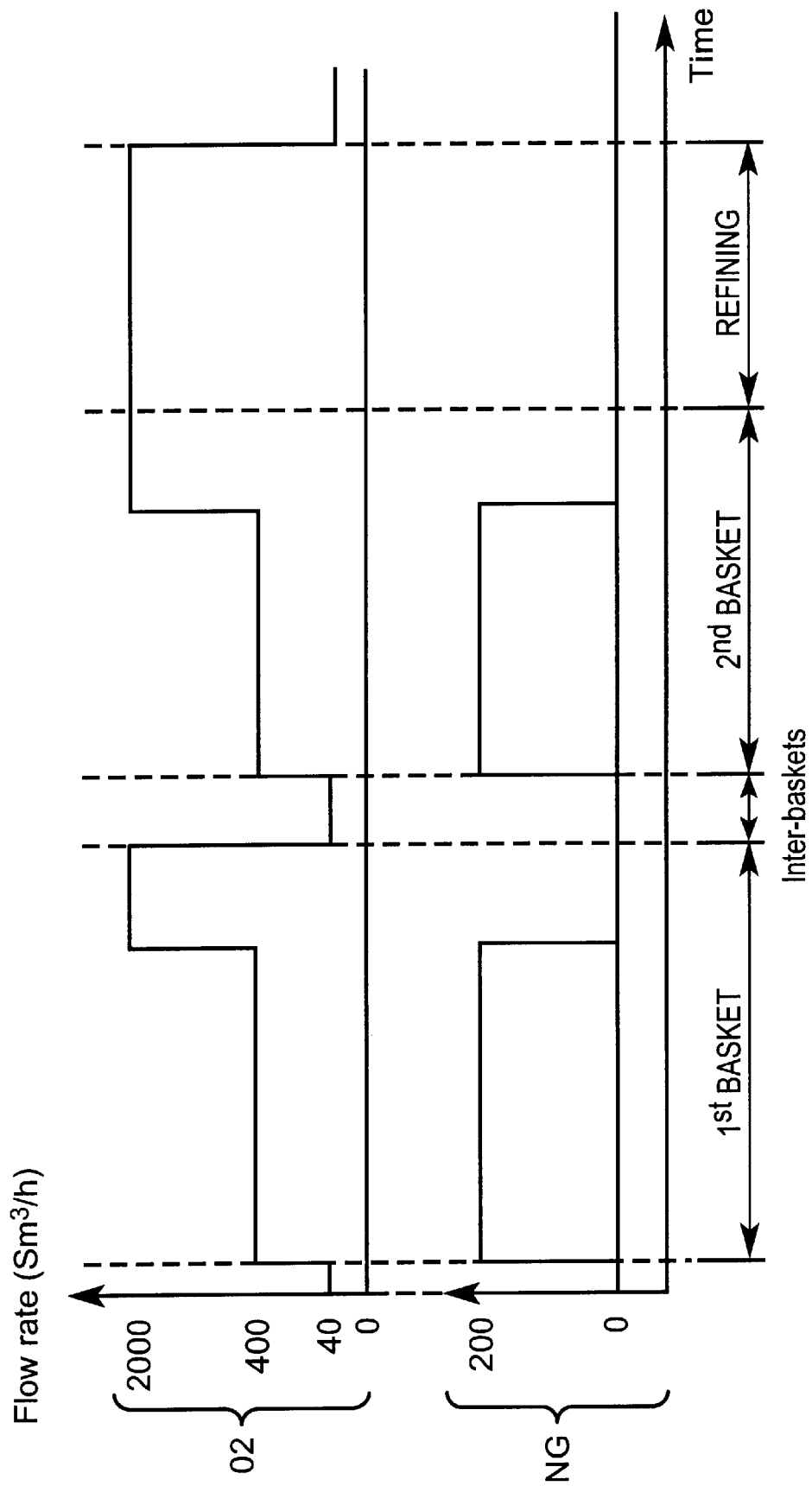
Figure 7:
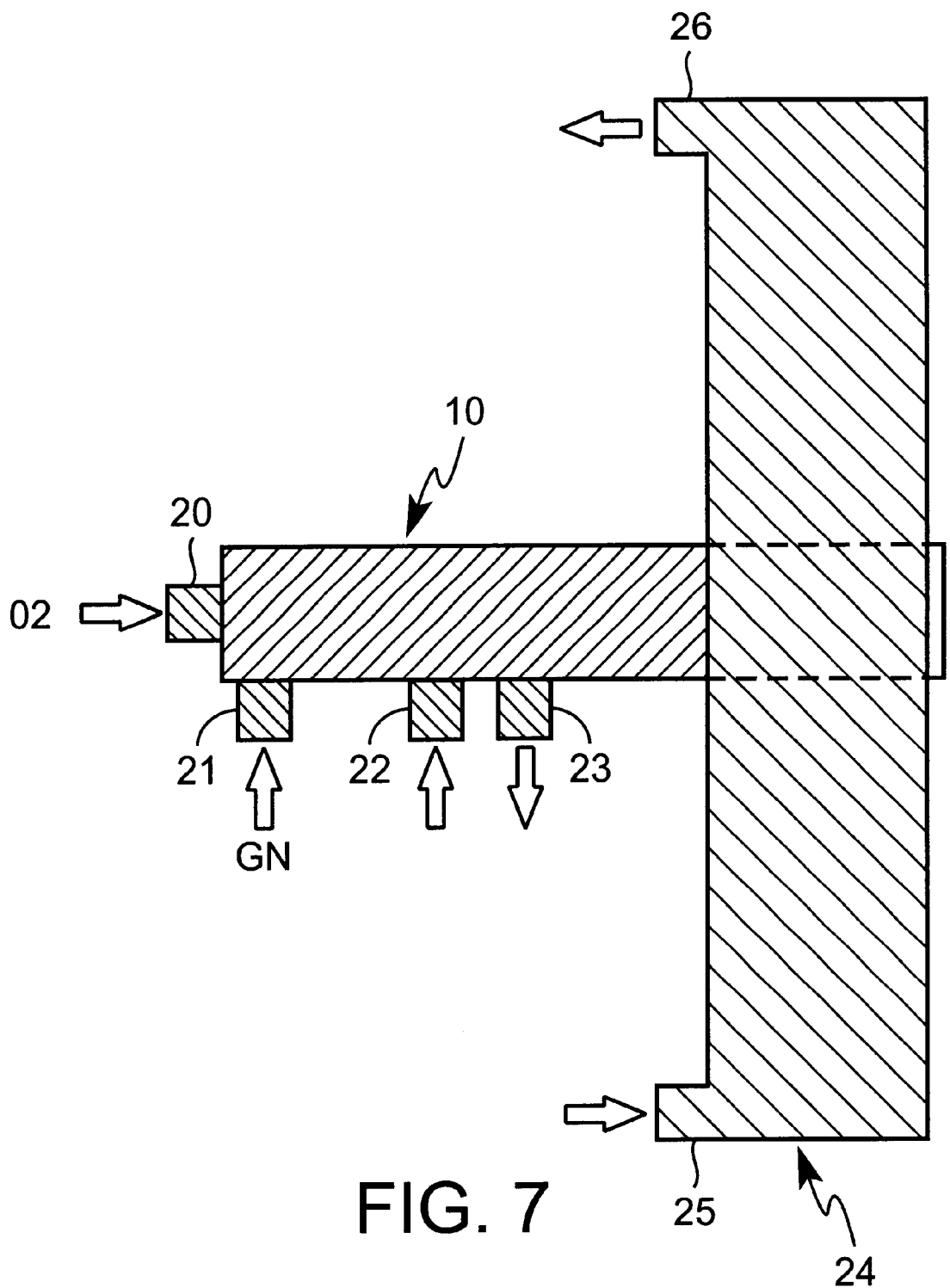

The invention will be better understood with the aid of the following embodiment examples, which are given non-limitingly, together with the figures, which show:

FIG. 1: a view in section of a supersonic oxygen injector used for carrying out the process according to the invention;

FIG. 2: a section of the so-called Laval nozzle according to the invention;

FIG. 3: a view in section of an electric arc furnace and the implanting of the supersonic injector on this furnace;

FIG. 4: a view from above of the furnace of FIG. 3;

FIG. 5: representative curves of the flow rates of oxygen and natural gas as a function of time for a steel production cycle;

FIG. 6: representative curves of the flow rates of oxygen and natural gas as a function of time for another type of steel production cycle; and FIG. 7: an outline diagram, seen from above, of the mounting of the injector on a furnace wall.

DETAILED DESCRIPTION OF THE PREFERRED EMBODIMENTS

FIGS. 3 and 4 show on an electric arc furnace 1 comprising a tank 2 surmounted by a cover 3 equipped with electrodes 4 for producing an electric arc between them and the metal contained in the base of the tank 2 in order to melt the metal and to keep it in the molten state.

The peripheral wall 5 of the furnace 1 is equipped with a supersonic oxygen injector 10 of axis X situated above the bath 6 of molten metal. The axis X of the injector 10 forms an angle γ with respect to the perpendicular 7 of between 30° and 60°. The nozzle 11 of the injector 10, situated inside the tank 2, is above the bath 6 at a height of H=L×cos γ. In addition, as is shown on FIG. 4, the axis X of the injector 10 can have an angle δ with respect to the vertical radial plane 8 of the tank 2 which passes through the nozzle 11 of the injector 10.

FIGS. 1 and 2 show in detail the configuration of the injector 10 according to the invention. This injector comprises a central conduit 12 rotating around the axis X and an annular conduit 13 of axis X surrounding the central conduit 12 at a short distance. These two conduits 12 and 13 emerge in the premixing chamber 11 of the injector 10 with, respectively, a circular orifice 14 and an annular orifice 15. The precombustion chamber 11 is equipped with a converging part 11*bis* which emerges from the nozzle of the injector 11*ter*. In fact, in the case where a flame is realized, it is important that the separate injections of oxygen and fuel mix rapidly in order to obtain a stable flame in particular. It is therefore possible either to converge the feed channels of these two gases in the precombustion chamber, which can first have a substantially cylindrical shape, or to cause these two gases to emerge in parallel into the chamber, the walls of which converge, such that mixing is realized rapidly.

To this effect, the central conduit 12 is demarcated upstream by a cylindrical wall 16 connected to an oxygen source, which is not shown on the drawings, and downstream by a nozzle 20 of the Laval type shown in detail on FIG. 2.

This nozzle 20 has, from upstream to downstream (in the direction of flow of the gas), a converging part 21, a throat 22 where the velocity of the oxygen becomes sonic, a diverging part 23 where the velocity of the oxygen becomes supersonic and a straight part 24 which emerges through the orifice 14 and the aim of which is to stabilize the jet of oxygen. The dimensions of the various portions of the nozzle 20 and the intake pressure of the nozzle 20 are calculated as a function of the desired flow rate of oxygen and the desired exit velocity of the jet through the orifice 14 such that the jet passes through the slag and penetrates into the bath 6 during the refining phase and such that the static pressure of the oxygen at the exit of the injector liter is substantially equal to the pressure of the atmosphere prevailing in the furnace 1.

The angles α and β which the generating lines of the diverging part 23 and of the converging part 21 make respectively with the axis X and which are in fact the cone half-angles of the diverging part 23 and of the converging part 21 are of particular importance. The angle α must be between 2° and 12° and the angle β must be in the range of 20–35°.

For a highly optimized nozzle 20, the angles α and β have the value 4° and 20° respectively. So that shocks are not generated in the flow of oxygen, the nozzle 20 must not have geometric discontinuities, and for this reason the sharp edges of the throat 22 and of the diverging part 23 are replaced by rounded joining surfaces having the radii of curvature referenced R1, R2 and R3 on FIG. 2.

The preferred values for the radii of curvature R1, R2 and R3 are the following:

$$R1 = \frac{D_{throat}}{2} \frac{1}{\tan\beta} + \frac{1}{\sin\beta}$$

$$R2 = \frac{D_{throat}}{2} \frac{1}{\tan\alpha} + \frac{1}{\sin\alpha}$$

$$R3 = \frac{D_{throat}}{2} \frac{1}{\tan\alpha} + \frac{1}{\sin\alpha}$$

In preferably supersonic mode, the velocity of the jet of oxygen at the exit of the nozzle is between Mach 1.5 and Mach 2.5. The flow rate of the supersonic jet is preferably between 50 and 4000 $Sm^3/h$, and preferentially between 1000 and 3500 $Sm^3/h$. An $Sm^3$ of gas corresponding to a volume of gas measured under so-called "normal" conditions of time and pressure (273 K and atmospheric P).

The premixing chamber 11 has dimensions such that its diameter upstream is at least equal to that of the annular collar 15. This chamber comprises a converging part 11*bis*, the half-angle of which is between 0 and 25° and the length of which is between 1 and 5 times the exit diameter of the Laval nozzle. This converging part 11*bis* emerges on the nozzle of the injector 11*ter*.

If the injector 10 is used to supply oxygen at a subsonic velocity for combustion of the natural gas NG, the maximum flow rate of the oxygen is substantially divided by 5, and the injector 10 functions in burner mode. The annular channel 13 is designed such that the velocity of the natural gas is close to that of the oxygen delivered to the exit 14. The velocity of the flame is preferably between 150 m/s and Mach 1. The power of the flame is preferably between 0.5 and 5 MW. The flow rate of the natural gas is substantially equal to half the flow rate of oxygen in order to have a stoichiometric flame.

FIG. 5 gives an example of the use of an injector 10 having a supersonic nozzle 20, the shape of which is such that it enables 2000 $Sm^3/h$ to be delivered at Mach 2.1 at its exit at a pressure of $10^5$ pascals and a temperature of 300 K, in an electric arc furnace.

In stand-by mode, it is used during the periods when the nozzle is not useful and, to avoid any risk of blockage by accidental spraying of the end with molten metal, a low flow rate of oxygen (40 $Sm^3/h$, for example) passes through the nozzle 20. In burner mode, a limit could be set, for example, at a flow rate of 400 $Sm^3/h$ of oxygen in a subsonic manner.

200 $Sm^3/h$ of natural gas NG is thus injected to provide a stoichiometric flame with a power of 2 MW at the start of the phase of melting of the metal. In this example, an exit velocity of the natural gas close to that of the oxygen and at about 250 m/s has been chosen.

In lance mode, that is to say during the phase of refining the steel, the nozzle 20 discharges 2000 Sm³/h at Mach 2.1. There is no flow rate of natural gas during functioning of the nozzle in lance mode.

FIG. 6 is another example of the use of an injector 10 having a nozzle 20 capable of a flow rate of 2000 Sm³/h at Mach 2.1 on an electric arc furnace in which two successive baskets are introduced. In stand-by mode, a low flow rate of oxygen passes through the nozzle 20 (with or without a corresponding low flow rate of natural gas in the peripheral collar). In lance mode, the nozzle 20 discharges 2000 Sm³/h at Mach 2.1.

In burner mode, only 400 Sm³/h of oxygen are passed through in a subsonic manner. 200 Sm³/h of natural gas are thus injected at a velocity close to that of the oxygen, and a stoichiometric flame with a power of 2 MW is obtained. During the melting period, at the start of each basket, the injector 10 is used in burner mode, and when the amount of scrap iron decreases, the injector 10 is then used in lance mode. During the refining period, the injector 10 is used in lance mode.

In the two use examples described above, the nozzle 20 delivers the oxygen at subsonic velocity when it is in burner mode, and delivers the oxygen in a supersonic manner when it is in lance mode.

FIG. 7 shows the installation of the injector 10 on a cooled wall of the furnace 1. The injector 10 has a connection 20 for the oxygen feed and a connection 21 for the natural gas NG feed. It is also equipped with an internal water-cooling surface which has a water intake 22 and exit 23 connected to an external circuit.

The water-cooled part of the injector 10 is arranged in a copper heat exchanger 24 cooled by water entering through connection 25 and exiting through connection 26.

This exchanger 24 is mounted in the peripheral wall 5 of the tank 2.

EMBODIMENT EXAMPLE

Numerical example of application in an electric arc furnace:
M=2.2 is chosen, corresponding to a value suitable for injection of oxygen into steel. This velocity can be realized in all steel works at the flow rates usually used. It represents a good compromise between the available pressure and flow rate and the velocity of the jet.

Volume flow rate=5000 Sm³/h

Jet Of O₂ (molar mass=0.032 kg/mole)

Ambient T (inside the furnace)=2000 K

For this case, L=1.93 m.

The flow rate taken as an example corresponds to a flow rate commonly employed in a steel works on an electric arc furnace, the tonnage of which is greater than 100 tonnes. It enables a significant amount of oxygen to be injected, taking into account the time of use of the injector in the course of one smelting. The flow rate of the injector is a function of the local conditions of each steel works. It depends on the type of furnace, the tonnage of the charge, its mode of operation and its type of charging.

This calculation is given by way of example to demonstrate the yields of the invention in the configuration of the example.

What is claimed is:

1. Process for injection of a gas, with the aid of a nozzle into a liquid metal bath contained in a metallurgical vessel, the nozzle being installed in the side wall of the vessel and orientated at an angle α with respect to the perpendicular, the downstream end of the nozzle through which the gas escapes in the direction of the liquid metal bath being situated at a distance L from the surface of the liquid metal, the nozzle being fed by the gas through its upstream end at a pressure $P_1$, and being ejected from the nozzle through its downstream end at a pressure $P_2$, the process comprising ejecting the gas from the nozzle into the metallurgical vessel such that the downstream pressure $P_2$ and the pressure $P_3$ in the metallurgical vessel are connected to one another by the relationship:

$$0.9P_3 \leq P_2 \leq 1.1P_3,$$

the distance L between the downstream end of the nozzle and the surface of the liquid metal is equal to $$L(m) = C * \sqrt{qe} \pm 0.15(m)$$

where $$C = \sqrt{\frac{4}{\pi * P_2 * M}} \left[ \frac{\gamma}{RTo} \left(1 + \frac{\gamma-1}{2} M^2 \right) \right]^{-1/4} *$$

$$\left[ 4.2 + 1.1 * \left( M^2 + 1 - \frac{T_j}{T_a} \right) \right] \sqrt{\frac{\rho_j}{\rho_a}}$$

In which expression:

$P_2$: pressure of the jet at the exit,

M: Mach number calculated according to the following formula:

$$M^2 = \frac{2}{(\gamma-1)} * \left[ \left( \frac{P_1}{P_2} \right)^{\left(\frac{\gamma-1}{\gamma}\right)} - 1 \right]$$

$T_o$: temperature of the gas (K),

γ: ratio of $C_p/C_v$, $C_p$ and $C_v$ being, respectively, the molar thermal capacities at constant pressure or volume, R: ideal gas constant (8.314/molar mass of the gas), qe: mass flow rate (kg/s)=volume flow rate (Sm³/h) *molar mass of the gas/3600/0.0224 (l/mol), $T_j$: temperature at the exit of the nozzle (K), $\rho_j$: density of the jet at the exit of the nozzle (kg/m³), calculated from:

$$\frac{P_2}{R * T_j}$$

$T_a$: temperature of the ambient medium (K), $\rho_a$: density of the ambient medium (kg/m³), calculated from:

$$\frac{P_3}{R * T_a}$$

the injection of the gas being carried out when the temperature of the gases in the metallurgical vessel is greater than 800° C.

2. Injection process according to claim 1, wherein the gas comprises a gas selected from the group consisting of oxygen, nitrogen, argon, hydrogen, carbon monoxide, carbon dioxide, alkanes, alkenes, alkynes, natural gas and sulphur hexafluoride, by themselves or as mixtures.

3. Process according to claim 1, wherein the velocity of the gas during its ejection by the nozzle is supersonic.

4. Process according to claim 1, wherein the nozzle for injection of the gas is a nozzle comprising, from upstream to downstream, according to the direction of entrainment of the gas, a convergent truncated upstream part, followed by a cylindrical central part, followed by a divergent truncated downstream part which emerges over the atmosphere of the metallurgical vessel, the ratio of the vertex angles of the convergent and divergent cones respectively being between about 1.5 and 2.5.

5. Process according to claim 1, wherein the angle $\alpha$ is such that:

$$30° \leq \alpha \leq 60°.$$

6. Injection process according to claim 1, wherein the metal is steel and the injection gas is oxygen.

7. Process according to claim 1, wherein the gas injected into the metal is a hydrocarbon or a mixture of gaseous hydrocarbons.

8. Process according to claim 1, wherein the injection of gas is carried out in alternation with the injection of a flame into the metallurgical vessel from a wall of the vessel in the direction of a solid and/or liquid metal present in the vessel.

9. Process according to claim 1, wherein the injection of gas is carried out simultaneously with that of a flame into the metallurgical vessel from a wall of the vessel in the direction of a solid and/or liquid metal present in the vessel.

10. Process according to claim 1, wherein the nozzle is a Laval nozzle which has, from upstream to downstream, a converging part, a throat where the velocity of the oxygen becomes sonic, a diverging part where the velocity of the gas injected becomes supersonic and a straight part in which the jet of gas is stabilized, the said nozzle having dimensions which are a function of the desired flow rate and exit velocity of the jet of gas, the pressure of the gas at the intake of the nozzle being such that the pressure of the jet of gas at the exit of the nozzle is substantially equal to the pressure of the surrounding atmosphere.

11. Process according to claim 1, wherein the nozzle comprises from upstream to downstream, a converging part, a throat, a diverging part and a straight part, and wherein the nozzle has rounded joining surfaces between, respectively, the converging part, the throat, the diverging part and the straight part.

12. Process according to claim 1, wherein a convergent cone half-angle is between 2 and 12° and a divergent cone half-angle is between 15° and 35°.

13. Process according to claim 1, wherein the velocity of a supersonic jet of gas at the exit of the nozzle is between Mach 1.5 and Mach 2.5.

14. Process according to claim 1, wherein the flow rate of the gas is between 50 and 5000 Sm³/h.

15. Process according to claim 1, wherein the melting of a metal is accelerated by burning a natural gas at the start of the period of melting of the metal, the natural gas being introduced through an annular channel surrounding the nozzle, and oxygen necessary for the combustion of the natural gas being injected through the nozzle.

16. Process according to claim 15, wherein during the period of acceleration of the melting, the oxygen leaves the nozzle at a subsonic velocity.

17. Process according to claim 14, wherein the velocity of the flame is between 150 m/s and 300 m/s.

18. Process according to any claim 14, wherein the power of the flame is between 0.5 and 5 MW.

19. Process according to claim 16, wherein the ratio of the flow rates of oxygen delivered by the injector in supersonic mode and in burner mode is substantially equal to 5.

20. Process according to claim 2, wherein the velocity of the gas during its ejection by the nozzle is supersonic.

21. Process according to claim 2, wherein the nozzle for injection of the gas is a nozzle comprising, from upstream to downstream, according to the direction of entrainment of the gas, a convergent truncated upstream part, followed by a cylindrical central part, followed by a divergent truncated downstream part which emerges over the atmosphere of the metallurgical vessel, the ratio of the vertex angles of the convergent and divergent cones respectively being between about 1.5 and 2.5.

22. Process according to claim 3, wherein the nozzle for injection of the gas is a nozzle comprising, from upstream to downstream, according to the direction of entrainment of the gas, a convergent truncated upstream part, followed by a cylindrical central part, followed by a divergent truncated downstream part which emerges over the atmosphere of the metallurgical vessel, the ratio of the vertex angles of the convergent and divergent cones respectively being between about 1.5 and 2.5.

23. Process according to claim 2, wherein the angle $\alpha$ is such that:

$$30° \leq \alpha \leq 60°.$$

24. Process according to claim 3, wherein the angle $\alpha$ is such that:

$$30° \leq \alpha \leq 60°.$$

25. Injection process according to claim 2, wherein the metal is steel and the injection gas is oxygen.

26. Injection process according to claim 3, wherein the metal is steel and the injection gas is oxygen.

27. Process according to claim 2, wherein the gas injection into the metal is a hydrocarbon or a mixture of gaseous hydrocarbons.

28. Process according to claim 3, wherein the gas injected into the metal is a hydrocarbon or a mixture of gaseous hydrocarbons.

29. Process according to claim 2, wherein the injection of gas is carried out in alternation with the injection of a flame into the metallurgical vessel from a wall of the vessel in the direction of a solid and/or liquid metal present in the vessel.

30. Process according to claim 3, wherein the injection of gas is carried out in alternation with the injection of a flame into the metallurgical vessel from a wall of the vessel in the direction of a solid and/or liquid metal present in the vessel.

31. Process according to claim 2, wherein the injection of gas is carried out simultaneously with that of a flame into the metallurgical vessel from a wall of the vessel in the direction of a solid and/or liquid metal present in the vessel.

32. Process according to claim 3, wherein the injection of gas is carried out simultaneously with that of a flame into the metallurgical vessel from a wall of the vessel in the direction of a solid and/or liquid metal present in the vessel.

33. Process according to claim 2, wherein the nozzle is a Laval nozzle which has, from upstream to downstream, a converging part, a throat where the velocity of the oxygen becomes sonic, a diverging part where the velocity of the gas injected becomes supersonic and a straight part in which the jet of gas is stabilized, the nozzle having dimensions which are a function of the desired flow rate and exit velocity of the jet of gas, the pressure of the gas at the intake of the nozzle being such that the pressure of the jet of gas at the exit of the nozzle is substantially equal to the pressure of the surrounding atmosphere.

34. Process according to claim 3, wherein the nozzle is a Laval nozzle which has, from upstream to downstream, a converging part, a throat where the velocity of the oxygen becomes sonic, a diverging part where the velocity of the gas injected becomes supersonic and a straight part in which the jet of gas is stabilized, the nozzle having dimensions which are a function of the desired flow rate and exit velocity of the jet of gas, the pressure of the gas at the intake of the nozzle being such that the pressure of the jet of gas at the exit of the nozzle is substantially equal to the pressure of the surrounding atmosphere.

35. Process according to claim 2, wherein the nozzle comprises from upstream to downstream, a converging part, a throat, a diverging part and a straight part, and wherein the nozzle has rounded joining surfaces between, respectively, the converging part, the throat, the diverging part and the straight part.

36. Process according to claim 3, wherein the nozzle comprises from upstream to downstream, a converging part, a throat, a diverging part and a straight part, and wherein the nozzle has rounded joining surfaces between, respectively, the converging part, the throat, the diverging part and the straight part.

37. Process according to claim 2, wherein a convergent cone half-angle is between 2 and 12° and a divergent cone half-angle is between 15° and 35°.

38. Process according to claim 3, wherein a convergent cone half-angle is between 2 and 12° and a divergent cone half-angle is between 15° and 35°.

39. Process according to claim 2, wherein the velocity of a supersonic jet of gas at the exit of the nozzle is between Mach 1.5 and Mach 2.5.

40. Process according to claim 3, wherein the velocity of a supersonic jet of gas at the exit of the nozzle is between Mach 1.5 and Mach 2.5.

41. Process according to claim 2, wherein the flow rate of the gas is between 50 and 5000 $Sm^3/h$.

42. Process according to claim 3, wherein the flow rate of the gas is between 50 and 5000 $Sm^3/h$.

43. Process according to claim 2, wherein the melting of a metal is accelerated by burning a natural gas at the start of the period of melting of the metal, the natural gas being introduced through an annular channel surrounding the nozzle, and oxygen necessary for the combustion of the natural gas being injected through the nozzle.

44. Process according to claim 3, wherein the melting of a metal is accelerated by burning a natural gas at the start of the period of melting of the metal, the natural gas being introduced through an annular channel surrounding the nozzle, and oxygen necessary for the combustion of the natural gas being injected through the nozzle.

45. Process according to claim 43, wherein during the period of acceleration of the melting, the oxygen leaves the nozzle at a subsonic velocity.

46. Process according to claim 44, wherein during the period of acceleration of the melting, the oxygen leaves the nozzle at a subsonic velocity.

47. Process according to claim 15, wherein the velocity of the flame is between 150 m/s and 300 m/s.

48. Process according to claim 15, wherein the power of the flame is between 0.5 and 5 MW.

49. Process according to claim 16, wherein the power of the flame is between 0.5 and 5 MW.

50. Process according to claim 17, wherein the ratio of the flow rates of the gas delivered by the injector in supersonic mode and in burner mode is substantially equal to 5.

51. Process according to claim 18, wherein the ratio of the flow rates of the gas delivered by the injector in supersonic mode and in burner mode is substantially equal to 5.

52. Process according to claim 5, wherein the angle $\alpha=45°\pm5°$.

53. Process according to claim 7, wherein the gas injected into the metal is natural gas.

54. Process according to claim 23, wherein the angle $\alpha=45°\pm5°$.

55. Process according to claim 24, wherein the angle $\alpha=45°\pm5°$.

56. Process according to claim 27, wherein the gas injected into the metal in natural gas.

57. Process according to claim 28, wherein the gas injected into the metal in natural gas.

58. Process according to claim 1, wherein the injection of the gas is carried out when the temperature of the gases in the metallurgical vessel is greater than 1000° C.

59. Process according to claim 14, wherein the flow rate of the gas is between 1000 and 3500 $Sm^3/h$.

60. Process according to claim 41, wherein the flow rate of the gas is between 1000 and 3500 $Sm^3/h$.

61. Process according to claim 42, wherein the flow rate of the gas is between 1000 and 3500 $Sm^3/h$.

62. Process according to claim 2, wherein the gas comprises oxygen.

* * * * *